May 8, 1962 T. M. RIDDICK 3,033,372
APPARATUS FOR CIRCULATING LARGE BODIES OF LIQUID
Filed Aug. 15, 1957 3 Sheets-Sheet 1
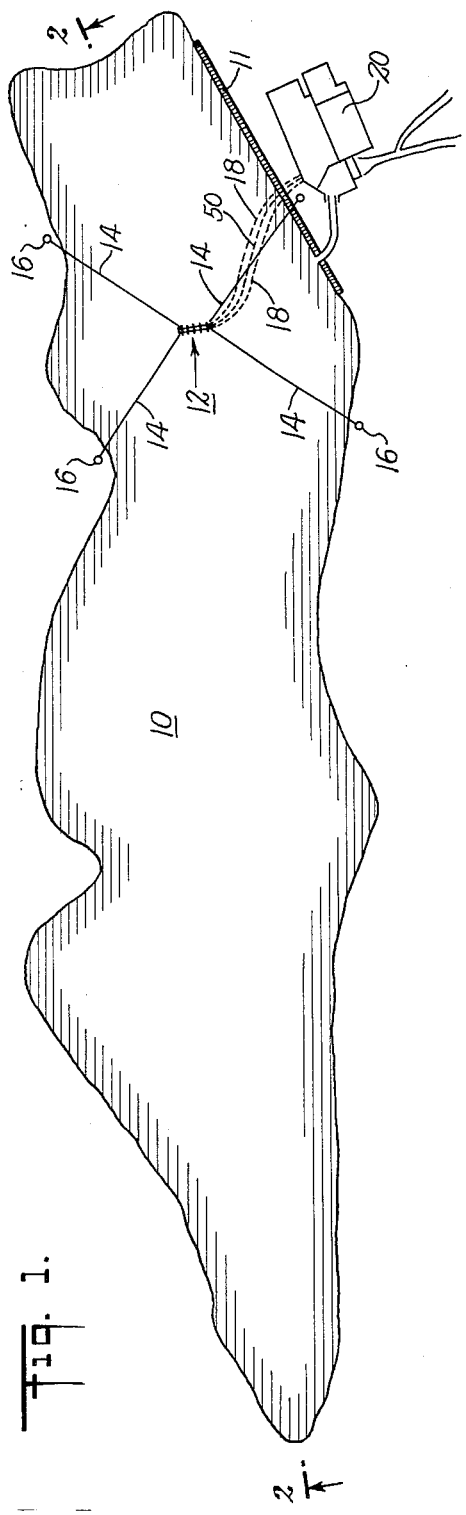
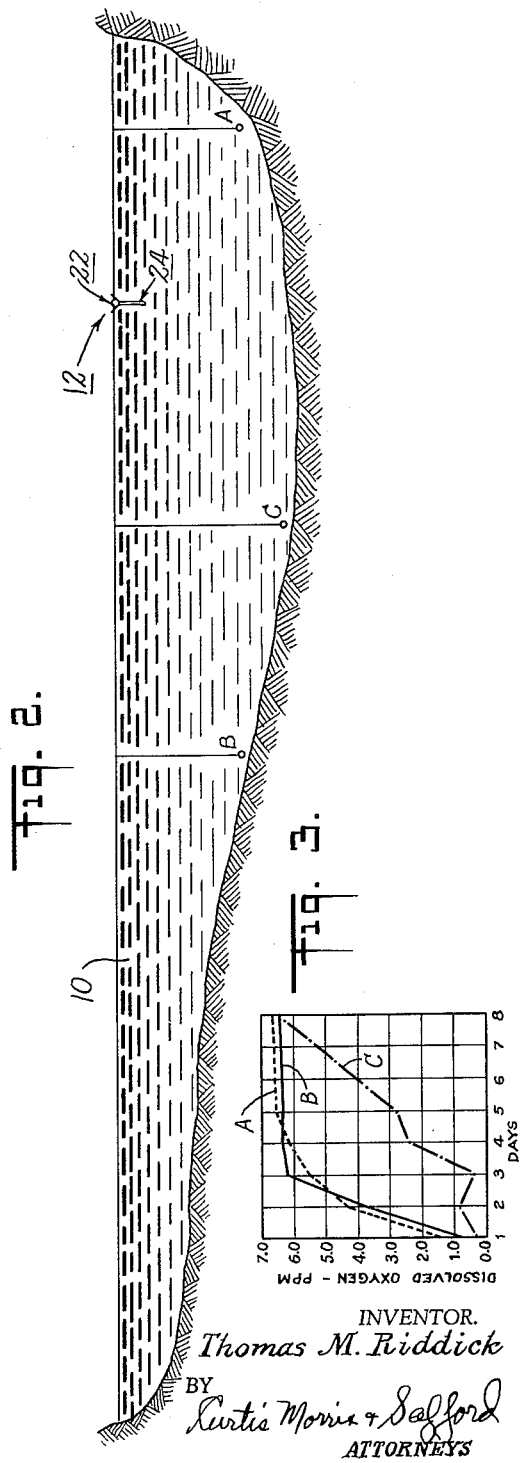
INVENTOR.
Thomas M. Riddick
BY
Curtis Morris & Safford
ATTORNEYS May 8, 1962  T. M. RIDDICK  3,033,372
APPARATUS FOR CIRCULATING LARGE BODIES OF LIQUID
Filed Aug. 15, 1957  3 Sheets-Sheet 2
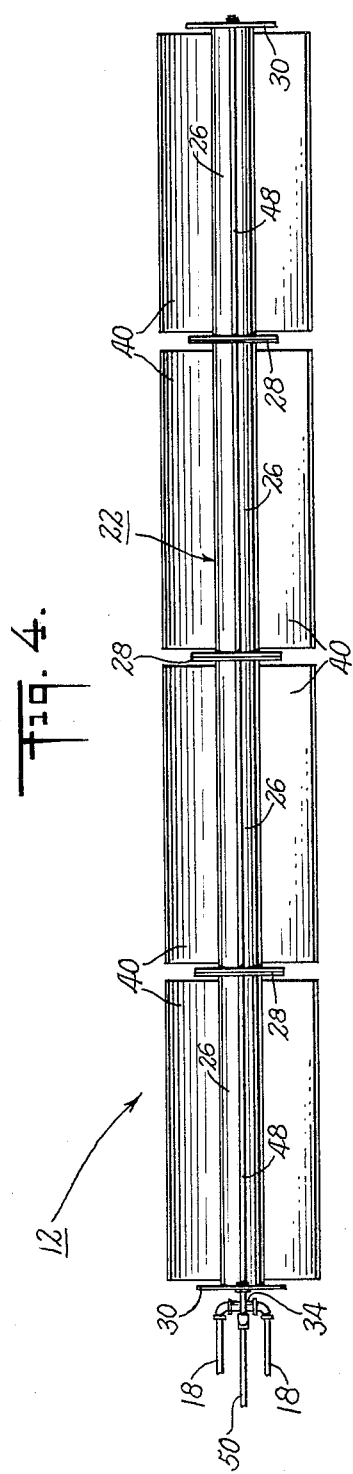
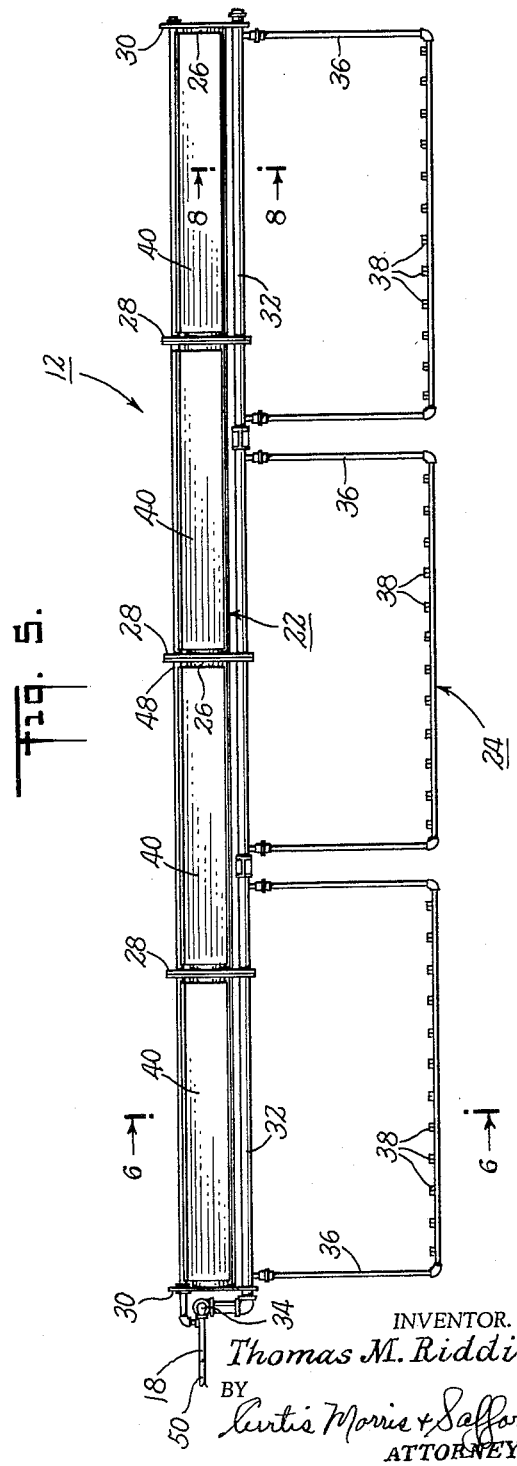
INVENTOR.
Thomas M. Riddick
BY
Curtis Morris & Safford
ATTORNEYS

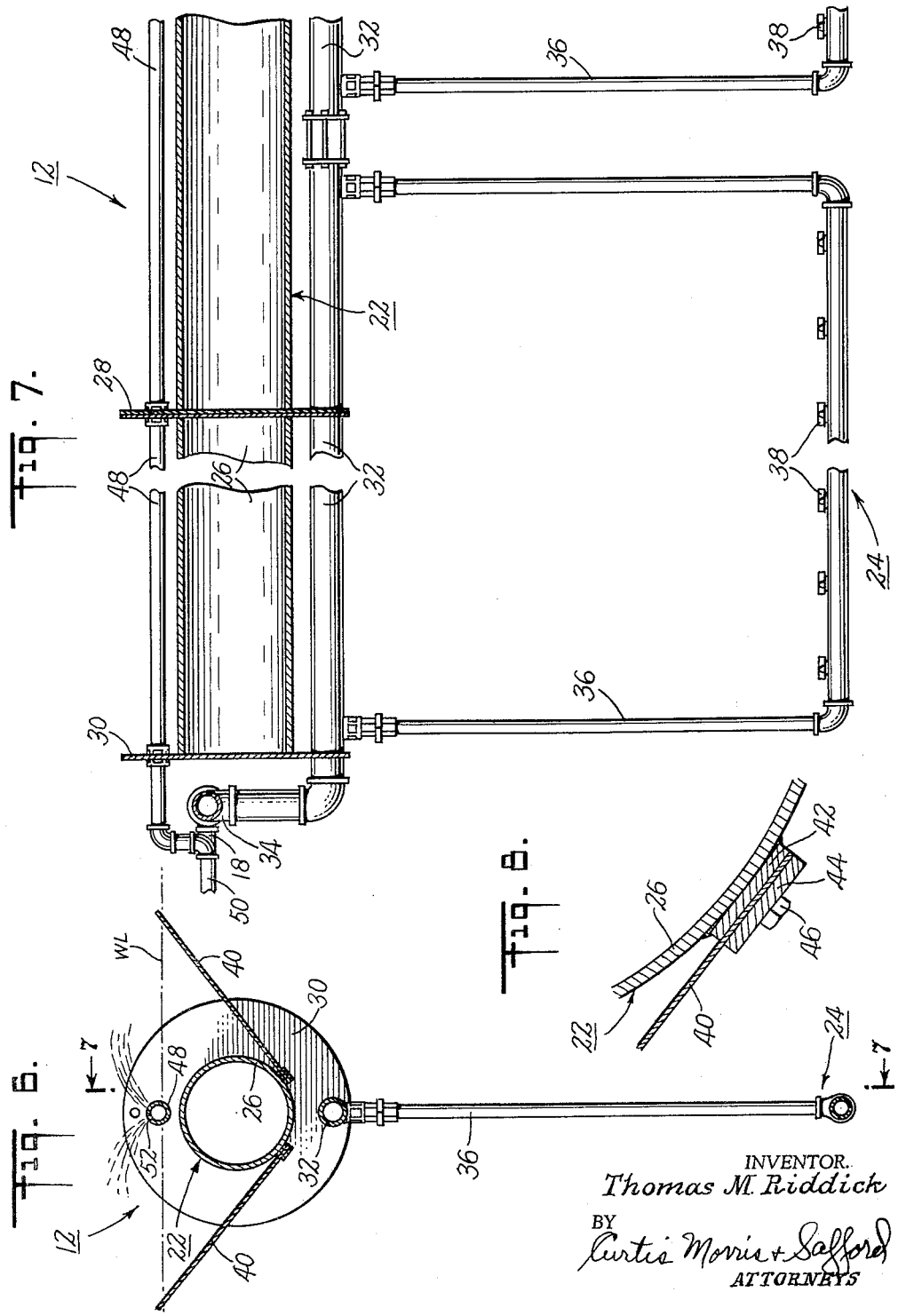

3,033,372
APPARATUS FOR CIRCULATING LARGE BODIES OF LIQUID
Thomas M. Riddick, 200 East End Ave., New York 28, N.Y.
Filed Aug. 15, 1957, Ser. No. 678,364
2 Claims. (Cl. 210—220)

This invention relates to the treatment of large bodies of relatively quiescent liquids such as the waters of reservoirs, bodies of industrial and domestic wastes held in detention basins, or lagoons, and the like. More particularly the invention relates to a novel method and apparatus whereby a very small amount of power can be used to produce effective circulation of the entire volume of such a body of liquid, thereby facilitating treatment of the body of liquid with any of various treating agents to improve the properties of the liquid. The bodies of liquid that can be usefully treated in accordance with the present invention include natural and artificial reservoirs, lakes, ponds, basins or lagoons for industrial wastes and the like which are relatively quiescent, that is, which have inflow and outflow rates such that the detention time of the body of liquid in its natural or artificial container is more than say one day. Such bodies of liquid are normally held in containers having at least in part earth retaining-walls and bottoms, since a completely concrete-lined or metal container would be prohibitively expensive. For convenience in the following description the invention will be described in relation to its use for the treatment of the reservoir waters of a municipal water supply, although as the description proceeds it will become apparent that the invention can be advantageously used in the treatment of other large bodies of liquid as well, particularly industrial waste lagoons.

All reservoirs having a substantial depth tend to stratify to form three fairly well-defined zones commonly called from top to bottom (a) the zone of circulation, (b) the zone of transition, and (c) the zone of stagnation. In the temperate zones such a stratification occurs in reservoirs having a depth greater than about 15 feet. The depth of each zone is dependent upon the depth of the reservoir, the atmospheric temperature variations at the place where the reservoir is located, and the daily flow into and out of the reservoir. Reservoirs undergo two "overturns" yearly, one in the spring and one in the fall. These "overturns" are effected within a period of a week or so, after which the water is relatively uniform in composition from top to bottom. The "overturns" are caused by changes in the density of the water at the surface of the reservoir as the average atmospheric temperature rises in the spring and drops in the fall. In addition to these semi-annual "overturns" the top zone (the zone of circulation) sustains a daily overturn due to wind action and also to the warming effects of sunshine during the daylight hours and the corresponding cooling effect at night.

The stratification of reservoirs leads to numerous problems in the treatment of reservoir waters. Reservoirs are commonly fed by streams and brooks situated upstream from a natural or artificial dam, as well as by underground seepage through the overburden or upper earth strata or through high-lying consolidated previous material such as sandstone and limestone situated on the water shed. When rain, hail, snow or sleet falls on land surfaces, a portion of the resulting water flows overland by brooks and streams directly into reservoirs, a portion returns to the atmosphere by evaporation and transpiration, and a portion seeps underground and flows beneath land surfaces to the reservoir. The upper few inches of the crust of the earth, particularly soils which are cultivated for agricultural purposes or swamp lands which foster rank vegetation, are characterized by a very high concentration of bacteria, yeast, fungi, molds, actinomycetes, and other microbial organisms. Most of these organisms produce carbon dioxide in their metabolism so that the concentration of carbon dioxide of the interstitial air in say the top 12 inches of the soil is many times greater than the normal carbon dioxide content of the atmosphere which is about 0.03% by volume. Water seeping through this top soil layer therefore absorbs from ten to more than one-hundred times the concentration of carbon dioxide that is present in water which is in equilibrium with atmospheric air.

The high carbon dioxide content of this subsurface water results in a low pH, which enables the solution of limestone (calcium and/or magnesium carbonate) with the formation of calcium and/or magnesium bicarbonate. However, a great many reservoir waters throughout the United States have very low alkalinity due to the sparsity of limestone or other alkaline earths on the water shed.

This is a highly undesirable condition, for waters low in natural bicarbonate alkalinity (10 to 20 p.p.m.) are difficult to coagulate in a water treatment plant with alum or other floc forming chemicals. Also when raw reservoir waters low in natural bicarbonate alkalinity are employed for municipal supply, they are relatively corrosive to metal pipes of the water distribution system.

Whereas the carbon dioxide content of subsurface water flowing directly or indirectly into a storage reservoir is helpful in dissolving alkaline earths to form natural bicarbonate alkalinity, carbon dioxide in water also dissolves the undesirable elements iron and manganese (if present on the watershed) and transports them in solution to the reservoir. Carbon dioxide also holds iron in solution as ferrous bicarbonate in the bottom waters of practically all stratified reservoirs. In the zone of circulation where the water comes in contact with the atmosphere the oxygen content of the water is maintained at a relatively high level and the carbon dioxide content at a relatively low level. This causes much of the iron in the water to be precipitated as ferric hydrate, thus producing a desired relatively low iron content. However, in the stagnant zone decaying vegetation and other organic matter at the bottom of the reservoir tends to lower the oxygen content, and this low oxygen content coupled with a high carbon dioxide content prevents precipitation of iron.

It may be further noted that the color of the water in the circulation zone is decreased by the bleaching action of sunlight, whereas the water in the stagnant zone is not subjected to this bleaching action and has a higher color reading, often in the range of 55–100 p.p.m.

It is evident that most of the undesirable effects of stratification can be eliminated by continuous circulation of the reservoir waters in such manner that water from the zone of stagnation is continually brought to the surface of the reservoir. Thus the oxygen content of the water from the stagnant layer can be increased by direct contact with atmospheric air, and the carbon dioxide content can be correspondingly reduced. The color of the water can be decreased by the bleaching action of sunlight. Also lime or other alkalies can be added and converted to the desired bicarbonate alkalinity at the water surface by uptake of carbon dioxide from the atmosphere.

Although numerous advantages can be achieved by circulation of reservoir waters, the cost of effecting such circulation by conventional pumping methods is prohibitive. It is accordingly a principal object of the present invention to provide a novel and improved method and apparataus for inducing and maintaining circulation of a large body of liquid held in a reservoir, detention basin or the like having a large surface exposed to the atmosphere, so that all portions of the body of liquid will be repeatedly brought into contact with the atmosphere. It is another object of the invention to provide a method and apparatus of this type which permits the addition of chemical treating agents to such a large body of liquid with the assurance that the treating agents will be adequately dispersed and distributed throughout the entire body of liquid. It is still another object of the invention to provide a method of circulating a large body of liquid wherein the power required for circulation is very small in relation to the volume of liquid being circulated. Other objects of the invention will be in part obvious and in part pointed out hereafter.

The present invention is based upon the discovery that effective circulation of, for example, the water in a reservoir can be effectively achieved by bubbling a surprisingly small quantity of air upwardly through the reservoir water. The nature of the present invention may best be appreciated and understood by reference to the accompanying drawings which illustrate a reservoir to which the method of the present invention is adapted to be applied, and an air pump incorporating a preferred embodiment of the present apparatus invention and adapted to be used in carrying out the method of the invention.

In the drawings:

FIGURE 1 is a plan view of the reservoir showing the location of the air pump therein, FIGURE 2 is a vertical section through the reservoir taken on the line 2—2 of FIGURE 1 and indicating the variation of water depth in different parts of the reservoir and the depth to which the air pump extends therein, FIGURE 3 is a chart illustrating the way in which the oxygen content of the bottom waters of the illustrated reservoir varies as a function of time when the air pump of the present invention is operated therein, FIGURE 4 is a top plan view of an air pump incorporating a preferred embodiment of the present invention, FIGURE 5 is a side elevation of the pump of FIGURE 4 showing the air distributor pipes thereof, FIGURE 6 is an enlarged vertical section taken on line 6—6 of FIGURE 5 and particularly showing the deflection vanes of the air pump, FIGURE 7 is a vertical section taken on the line 7—7 of FIGURE 6, particularly showing the construction of the pump float, and FIGURE 8 is a fragmentary section taken on line 8—8 of FIGURE 5 showing the method of attachment of the deflection vanes to the float cylinder.

Referring to the drawings and more particularly to FIGURES 1 and 2, the reservoir 10, used herein to illustrate a typical application of the present invention, is formed by a dam 11 at the discharge end thereof and has a length of about 2250 feet from end to end and a width that is approximately 400 feet for most of its length. The depth of the reservoir varies from about 4 feet at the shallow (left-hand) end to a maximum depth of 27½ feet. The total volume of the reservoir is normally of the order of 100 million gallons and the normal withdrawal rate is about 1.5 million gallons per day.

A floating air pump 12, which will be described in detail hereafter, is positioned near the center of the reservoir 10 about 400 feet from the discharge (right-hand) end thereof and is held in position by the four cables 14 which extend from the pump 12 to four anchoring posts 16 on the banks of the reservoir. Air to operate the pump is supplied through a pair of flexible conduits 18 from a compressor (not shown) in a pumping station 20 located adjacent to the reservoir. As shown in FIGURE 2 the air pump is positioned over the deepest portion of the reservoir and extends only about one-fourth of the way to the bottom of the reservoir.

The construction of the air pump is shown in FIGURES 4 to 8 of the drawings. Referring particularly to FIGURES 4 and 5, the pump comprises in general a float 22 which supports an air distribution assembly 24 that extends downwardly from the float. The float is made up of four pipe sections 26 interconnected by means of three flanges 28 and having the blank flanges 30 secured to the opposite ends thereof to form a sealed cylinder capable of floating on the surface of the water and supporting the air distribution assembly 24.

Extending along underneath the float 22 there is an air header 32 which passes through holes in the flanges 28 and 30 and is supported thereby. At its left-hand end as viewed in FIGURES 4 and 5, air header 32 is provided with a fitting 34 through which it is connected to the discharge ends of the flexible air conduits 18 previously referred to in connection with the description of FIGURE 1. Thus air is supplied from a compressor located in the pumping station 20 through the flexible conduits 18 and fittings 34 to the air header 32.

Extending downwardly from and supported by the air header 32 are a series of U-shaped air distributor pipes 36. The horizontal run of each air distributor pipe 36 is provided with a plurality of spargers (air releasers) 38 through which air is discharged to form bubbles that rise upwardly toward the float 22. In the embodiment here described each sparger 38 is provided with four spaced holes about ¼″ in diameter for discharge of air. The pumping action is achieved by the air-water column above the spargers being reduced in mass from 62.5 pounds per cubic foot, the weight of water, to a lesser value due to the presence of the air bubbles therein. This causes the water surrounding the air-water column to flow toward the column and then rise vertically. Some vertical flow is also induced by the drag of the air bubbles on the water through which they pass.

The deflection vanes 40 may be secured to the float in any suitable manner. For example, referring to FIGURE 8, the pipe 26 has a strip 42 welded thereto, and the lower end of vane 40 is positioned between strip 42 and a second clamping strip 44. The strips 42 and 44 are tapped to receive bolts 46 by means of which the vane 40 is held firmly therebetween.

Referring to FIGURES 6 and 7 of the drawings, the air pump 12 may be provided if desired with means for supplying a chemical treating liquor, e.g. a lime suspension, to the circulating water. Extending along the top of float 22 there is a spray pipe 48 that passes through and is supported by the flanges 28 and 30. The spray pipe 48 is supplied with chemical treating solution from the pumping station 20 through a flexible tube 50 and is provided on its upper surface with spray holes 52 through which the treating liquor is sprayed onto the surface of the water.

An air pump of the type described above was positioned in the reservoir 10 in the manner shown in FIGURES 1 and 2 with the spargers 38 located approximately seven feet below the surface of the reservoir. Air was supplied to the air header 32 at the rate of 150 cubic feet per minute with a power input to the air compressor of approximately eight horsepower. Flow velocity measurements made at a distance of about ten feet on either side of the float 22 indicated that with this volume of air bubbling upwardly from the spargers 38 the lateral water velocity away from the float 22 at or near the water surface was approximately 1.5 feet per second.

In order to determine the effectiveness of the air pump in circulating the reservoir water, samples were taken for analyses at each of three sampling points located in the normal zone of stagnation of the reservoir. Referring to FIGURE 2, sampling points (A) and (B) were twenty feet below the surface of the reservoir and sampling point (C) was twenty-five feet below the surface. The variation in oxygen content at these three sampling points is plotted in FIGURE 3 of the drawings wherein the ordinates represent dissolved oxygen in parts per million and the abcissae represent the elapsed pumping time in days. By reference to FIGURE 3 it will be seen that at the time the air pump was placed in operation the maximum oxygen content at any of the three sampling points was about 1.5 parts per million. During the first two days of operation the oxygen content at sampling points (A) and (B) rose relatively rapidly to a value of about 6 p.p.m., that is almost to the value achieved by water that is in equilibrium with atmospheric air. The oxygen content at sampling point (C), which was very close to the bottom of the reservoir, rose more slowly, but at the end of eight days it too had achieved an oxygen content of about 6.5 p.p.m.

Other measurements and analyses made at the three sampling points indicated and at other points in the reservoir showed that at the end of a week of operation the temperature of the water had become relatively uniform from top to bottom, the carbon dioxide content of the water near the bottom of the reservoir had been substantially diminished, and the color of the water at the bottom of the reservoir had been materially lowered. More particularly the carbon dioxide content of the lower strata in the reservoir was reduced from a value in the range 10 to 20 p.p.m. to about 1 to 3 p.p.m. The bicarbonate alkalinity was increased from about 15 to about 35 p.p.m. at a pH of 6.8 to 7.3. The color was reduced from 55-60 p.p.m. to about 15-20 p.p.m.

It has been found that variations in the size of the bubbles do not appear to have any very significant effect on the pumping effectiveness within the practical range of operation, that is to say, with bubbles varying from 0.1" to 1" or 2" in diameter. In general the air flow should be sufficient to produce a lateral flow of water at the surface of at least 0.5 foot per second in the neighborhood of the point at which the bubbles reach the surface of the water. The maximum flow of air should desirably be maintained below the point at which the total surface area of the bubbles in the liquid at any given time is equal to the surface area of the body of liquid exposed to the atmosphere. The depth at which the air is introduced into the water in the reservoir may be varied and depends to some extent upon the maximum depth of the reservoir. At least a portion of the air should be introduced at a depth that is at least one-fifth of the maximum depth of the reservoir.

From the foregoing description it should be apparent that the present invention provides a method and apparatus capable of satisfying the several objectives set forth at the beginning of the present specification. Effective circulation of the reservoir water is achieved with a very small power input and this circulation of the water improves the properties of the water in the normally stagnant zone of the reservoir in many respects. Thus the oxygen content of this stagnant water is substantially increased and its carbon dioxide content decreased. Also the iron content of the water is reduced and its color is improved. By adding lime or other alkalies to the reservoir in conjunction with circulation of the water, the alkalinity of the reservoir water can be improved since it will absorb carbon dioxide from the air to form bicarbonates. Also the decreased carbon dioxide content in the lower strata of the reservoir decreases the algae content thereof, thereby substantially improving the potability of the water. These many advantages are provided with a quite small expenditure power.

It should be noted that the present method differs substantially from conventional aeration procedures wherein air is bubbled through a body of liquid at such a rate as to cause a significant transfer of oxygen from the air bubbles to the liquid. In the present method the total area of bubbles is less, in many cases substantially less, than the surface area of the liquid exposed to the atmosphere. The air is used essentially as a pumping medium, and transfer of oxygen from the air bubbles to the liquid is inconsequential in comparison with the oxygen absorbed from the atmosphere at the free surface of the body of liquid.

It is of course to be understood that the foregoing description is illustrative only. As previously indicated the present method and apparatus can be usefully employed not only in the circulation of reservoir waters but also in the circulation of industrial and other wastes where such wastes are contained in a detention basin, lagoon or the like so that they have a large surface area exposed to the atmosphere. The circulation of liquid according to the present invention may be used in conjunction with simultaneous treatment of the circulating liquid, either continuously or intermittently, with a chemical liquor; or alternatively circulation alone may be employed, relying upon the repeated contact with atmospheric air at the exposed surface of the body of liquid to produce the desired oxygen input and other chemical changes in the circulating liquid. Any of the conventional treating agents such as lime, alum, copper sulfate, chlorine etc. may be used with the assurance that these agents will be thoroughly distributed throughout the reservoir. Various novel treating procedures may be used effectively. For example, lime may be added as described above for a limited period of time, followed by a period of circulation only to convert the lime to bicarbonates by uptake of carbon dioxide from the atmosphere, and alum solution can then be sprayed through pipe 48 to produce bulk coagulation of the reservoir water. The air pump 12 may, of course, be a fixed stationary installation rather than the floating installation illustratively described, although a floating installation is preferable where water levels fluctuate more than a few feet. Other modifications within the scope of the invention will be apparent to those skilled in the art.

I claim:

1. An air pump for inducing circulation of a large body of liquid such as the water in a reservoir comprising in combination, an elongated float, an air supply header extending along the length of said float and supported thereon, a series of air supply conduits connected at their ends to said air header and looping downwardly therefrom, each of said air supply conduits being provided with spaced air discharge means for discharging air from said conduit to cause air to bubble up through said liquid, a pair of deflector vanes secured to said float and extending outwardly therefrom to deflect the rising air bubbles and thereby produce a lateral surface flow of liquid away from said float, and means for supplying air under pressure to said air header.

2. An air pump for inducing circulation of a large body of liquid such as the water in a reservoir comprising, in combination, an elonagted float comprising a series of pipe sections interconnected by flanges and having blank flanges on opposite ends thereof to form a liquid-tight compartment, an air-supply header extending along said float and supported in the peripheral portion of said flanges, a series of air-supply conduits connected at their ends to said air header and looping downwardly therefrom, each of said air supply conduits being provided with air discharge means for discharging air from said conduit, a chemical treating conduit extending along said float and supported in the peripheral portions of said flanges at points approximately diametrically opposite the points of support of said air header in said flanges, means for supplying air under pressure to said air header, and means for supplying a chemical liquor to said treating conduit.

References Cited in the file of this patent
UNITED STATES PATENTS

| | | |
|---|---|---|
| 285,591 | Dudley | Sept. 25, 1883 |
| 302,326 | d'Heureuse | July 22, 1884 |
| 1,813,827 | Swearingen | July 7, 1931 |
| 2,024,345 | Elrod | Dec. 17, 1935 |
| 2,144,385 | Nordell | Jan. 17, 1939 |
| 2,330,508 | McColl | Sept. 28, 1943 |
| 2,370,356 | Kamp et al. | Feb. 27, 1945 |
| 2,411,390 | Prager | Nov. 19, 1946 |
| 2,532,457 | Morgan et al. | Dec. 5, 1950 |
| 2,770,365 | Welsch | Nov. 13, 1956 |
| 2,822,329 | Griffith | Feb. 4, 1958 |
| 2,825,541 | Moll et al. | Mar. 4, 1958 |